(12) United States Patent
Dulick

(10) Patent No.: US 10,499,214 B2
(45) Date of Patent: *Dec. 3, 2019

(54) DATA USAGE ANALYTICS APPLICATION FOR DYNAMIC CONTROL OF DATA USAGE ON A CLIENT DEVICE

(71) Applicant: T-Mobile USA, Inc., Bellevue, WA (US)

(72) Inventor: Andrea Dulick, Albuquerque, NM (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/160,685

(22) Filed: Oct. 15, 2018

(65) Prior Publication Data

US 2019/0053019 A1 Feb. 14, 2019

Related U.S. Application Data

(63) Continuation of application No. 15/393,052, filed on Dec. 28, 2016, now Pat. No. 10,129,718.

(51) Int. Cl.
*H04W 4/24* (2018.01)
*H04L 12/14* (2006.01)
(Continued)

(52) U.S. Cl.
CPC .......... *H04W 4/24* (2013.01); *H04L 12/1435* (2013.01); *H04M 15/41* (2013.01); *H04M 15/44* (2013.01);
(Continued)

(58) Field of Classification Search
CPC .......... H04W 4/24; H04W 4/26; H04W 4/02; H04W 28/06; H04W 68/00; H04W 8/18;
(Continued)

(56) References Cited

U.S. PATENT DOCUMENTS 8,374,081 B2 * 2/2013 Farrugia et al. .............. 370/229
8,503,978 B2 8/2013 Gaddam et al.
(Continued)

OTHER PUBLICATIONS

Final Office Action for U.S. Appl. No. 15/393,052 dated Apr. 11, 2018, 15 pages.
(Continued)

*Primary Examiner* — Meless N Zewdu
(74) *Attorney, Agent, or Firm* — Han Santos, PLLC

(57) ABSTRACT

This disclosure sets forth techniques that aggregate and analyze data usage of a client device over a communications network. Particularly, data usage may be quantified over a predetermined time interval and used to provide recommendations that instruct a client on techniques for reducing a data usage rate. Recommendations may be presented as visual and/or audible alerts. This disclosure further describes techniques to dynamically alter data usage characteristics of particular data usage events to reduce a current rate of data usage. Computational instructions may dynamically reduce a file size of a multimedia/data file, limit a capability to download a multimedia/data file, or reduce a data usage rate of a multimedia stream via trans-rating or pacing techniques. Additionally, exemplary user interfaces may facilitate customizing data usage monitoring settings. The exemplary user interfaces may enable a client to customize a graphical representation of data usage over a predetermined period of time.

19 Claims, 10 Drawing Sheets

(51) Int. Cl.
*H04M 15/00* (2006.01)
*H04W 28/06* (2009.01)

(52) U.S. Cl.
CPC .......... *H04M 15/58* (2013.01); *H04M 15/60* (2013.01); *H04M 15/80* (2013.01); *H04M 15/8044* (2013.01); *H04M 15/81* (2013.01); *H04M 15/8214* (2013.01); *H04M 15/84* (2013.01); *H04M 15/846* (2013.01); *H04M 15/848* (2013.01); *H04M 15/852* (2013.01); *H04M 15/853* (2013.01); *H04M 15/857* (2013.01); *H04W 28/06* (2013.01)

(58) Field of Classification Search
CPC .......... H04W 4/30; H04W 4/50; H04W 4/60; H04W 28/16; H04W 28/20; H04W 28/22; H04W 4/029; H04W 28/10; H04W 28/12; H04W 28/18; H04W 28/24; H04W 88/00; H04W 88/02; H04W 88/08; H04W 88/18; H04W 68/12; H04L 12/14; H04L 12/1417; H04L 47/823; H04L 47/847; H04L 2012/5636; H04L 12/1435; H04M 15/00; H04M 7/0024; H04M 15/42; H04M 15/40; H04M 15/58; H04M 15/62; H04M 15/745; H04M 15/88; H04M 15/888; H04M 2215/782; H04M 15/60; H04M 15/66; H04M 15/80; H04M 15/70; H04M 15/84; H04M 15/835; H04M 15/41; H04M 15/44; H04M 15/81; H04M 15/846; H04M 15/848; H04M 15/852; H04M 15/853; H04M 15/857; H04M 15/1435; H04M 15/8044; H04M 15/8214; H04M 15/67; H04M 15/46; H04M 15/65; H04M 15/64; H04M 15/52; H04M 15/8083; H04M 2215/01; H04M 2215/0152; H04M 2215/0188
See application file for complete search history.

(56) References Cited

U.S. PATENT DOCUMENTS

| | | | |
|---|---|---|---|
| 9,402,004 | B2 | 7/2016 | Marimuthu et al. |
| 9,628,363 | B2 | 4/2017 | Singh et al. |
| 9,813,740 | B2* | 11/2017 | Panje et al. .... H04N 21/234363 |
| 10,129,718 | B2* | 11/2018 | Dulick .................... H04W 4/24 |
| 2006/0136421 | A1 | 6/2006 | Muthukrishnan et al. |
| 2006/0171356 | A1* | 8/2006 | Gurelli et al. ................ 370/329 |
| 2006/0230176 | A1* | 10/2006 | Dacosta ....................... 709/235 |
| 2007/0035706 | A1* | 2/2007 | Margulis ...................... 353/122 |
| 2009/0307228 | A1 | 12/2009 | Park et al. |
| 2011/0151831 | A1 | 6/2011 | Pattabiraman |
| 2012/0155296 | A1* | 6/2012 | Kashanian .................... 370/252 |
| 2012/0163203 | A1* | 6/2012 | Wilkinson et al. ........... 370/252 |
| 2013/0031231 | A1* | 1/2013 | Li et al. ........................ 709/223 |
| 2013/0149994 | A1 | 6/2013 | Gaddam et al. |
| 2013/0196615 | A1 | 8/2013 | Zalmanovitch et al. |
| 2014/0179266 | A1* | 6/2014 | Schultz et al. .......... H04W 4/26 |
| 2014/0273922 | A1 | 9/2014 | McMurry et al. |
| 2015/0139040 | A1 | 5/2015 | Lee |
| 2015/0237490 | A1 | 8/2015 | Chang et al. |
| 2015/0304390 | A1 | 10/2015 | Chakarapani et al. |
| 2015/0319488 | A1* | 11/2015 | Krikorian et al. .......................... H04W 21/44004 |
| 2015/0381826 | A1 | 12/2015 | Marimuthu et al. |
| 2016/0142559 | A1 | 5/2016 | Pollak |
| 2016/0315992 | A1* | 10/2016 | Ottur et al. ............. H04L 65/80 |
| 2017/0013071 | A1 | 1/2017 | McCrea |
| 2017/0026817 | A1 | 1/2017 | Levine et al. |
| 2017/0127101 | A1* | 5/2017 | Rasool et al. ... H04N 21/23430 |
| 2017/0208446 | A1* | 7/2017 | Adinarayan et al. ... H04W 4/26 |

OTHER PUBLICATIONS

Non-Final Office Action for U.S. Appl. No. 15/393,052 dated Nov. 30, 2017, 18 pages.

Notice of Allowance for U.S. Appl. No. 15/393,052 dated Jul. 11, 2018, 25 pages.

\* cited by examiner (Detail A)

(Detail B)**

DATA USAGE ANALYTICS APPLICATION FOR DYNAMIC CONTROL OF DATA USAGE ON A CLIENT DEVICE

RELATED APPLICATION

This application claims priority to a co-pending, commonly owned U.S. patent application Ser. No. 15/393,052, filed on Dec. 28, 2016, and title "Data Usage Analytics Application for Dynamic Control of Data Usage on a Client Device," which is herein incorporated by reference in its entirety.

BACKGROUND

As mobile devices become more sophisticated, consumers are relying more on mobile internet data connectivity as means of performing day-to-day tasks. To support the ever-increasing demand, telecommunications carriers offer service plans that allocate an allotment of data that consumers may use within a subscribed service plan cycle, nominally one month. However, consumers are often unaware of the amount of data usage that particular data usage events, or individual software applications, may consume when launched via their mobile devices. For example, a software application that access remote database entries may consume a relatively small amount of data when compared with particular data usage events, such as downloading or streaming multimedia content from an online resource.

Further, consumers are often left without sufficient resources to monitor, limit, and control the amount of data usage or the rate of data usage that particular data usage events may consume. As a result, in the event that a consumer depletes a data allowance allocation prior to the end of a subscribed service plan cycle, the consumer and telecommunications carrier representatives may be left frustrated by the lack of available transparency and granularity in identifying which data usage events and mobile computing device settings were disproportionately responsible for depleting the data allowance allocation.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
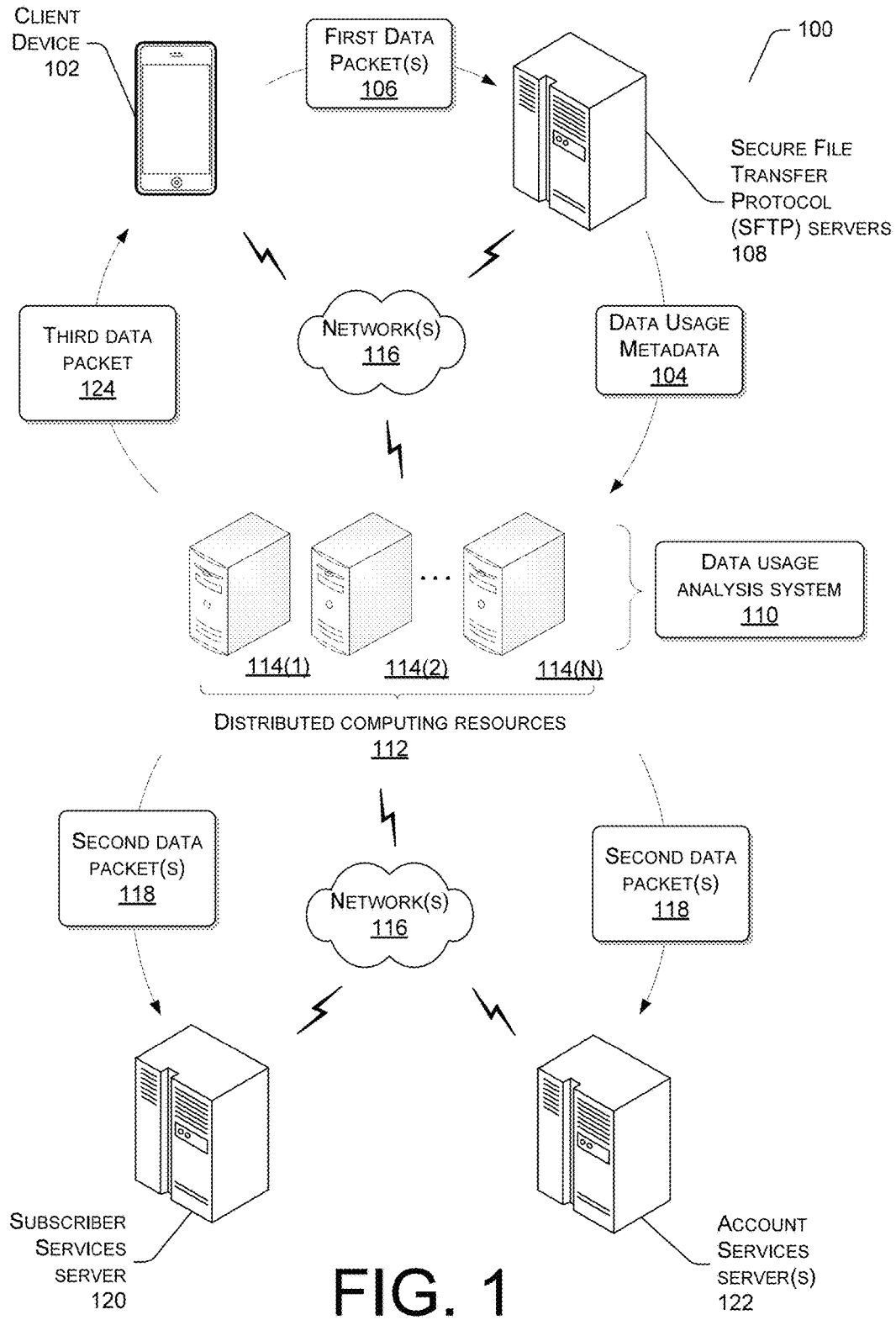
FIG. 1 illustrates a schematic view of a computing environment that facilitates dynamically altering data utilization of a client device over a cellular network, via a process of aggregating and analyzing data usage on the client device.

The disclosure sets forth techniques that aggregate and analyze data usage associated with a communications network, such as a cellular telecommunications network. Particularly, the systems and techniques quantify an amount of data usage or a rate of data usage that has occurred during a predetermined time interval, such as a billing cycle of network service plan. The amount of data usage and the rate of data usage may be determined by metadata that is continuously transmitted from a client device. The data usage metadata may describe an amount of data usage that occurs during each instance of data usage, timestamps associated with each instance of data usage, an indication data format(s) being streamed or downloaded, and an indication of software applications initiating each instance of data usage. In various examples, data usage may be associated with one or more client device(s), a client account, or a combination of both. Data usage may be measured by any appropriate unit of measure, such as but not limited to, bits, kilobytes, megabytes, gigabytes, terabytes, or petabytes. Further, the terms a "rate of data usage," and "data usage rate," may be used interchangeably, and may be measured by a bit rate. The term "bit rate," as used herein, refers to the number of bits per second that may be transmitted along a digital network.

The techniques disclosed herein may provide one or more recommendations that may reduce a current rate of data usage on a client device, based on monitored data usage events. Data usage events may include instances of multimedia streams, multimedia file downloads, or data file downloads. Further, the term "multimedia," as used herein, may describe content such as, but not limited to, video content, audio content, and image content.

The one or more recommendations may include visual and/or audible alerts that indicate a current status of data usage or a data usage rate. Additionally, recommendations may provide a client with suggestions to alter a device setting or change a particular behavior that may reduce a current rate of data usage. For example, a recommendation may suggest limiting use of a software application to an alternate communications network, if it is shown that the software application accounts for a disproportionate share of data usage. Similarly, and for the same reason, a recommendation may suggest downloading/streaming multimedia content via an alternate communications network. In another example, a recommendation may also suggest adjusting a video resolution or audio resolution of multimedia content to reduce a current rate of data usage. Delivery and receipt of the one or more recommendations may be configured via a user interface of a client device, provided the client device is authorized to do so.

The techniques disclosed herein further facilitates dynamically altering data usage characteristics of particular data usage events to reduce a current rate of data usage on a client device. Particularly, computational instructions may be generated and executed on a client device to dynamically perform one or more actions that reduce a current data usage rate associated with a particular data usage event. For example, computational instructions may dynamically reduce a file size of a multimedia file download or a data file download using transcoding techniques, limit a capability to download a multimedia file or a data file to a communications network that do not draw from a data allowance allocation, or automatically reduce a data usage rate of a multimedia stream using trans-rating techniques, pacing techniques, or a combination of both.

Additionally, the techniques disclosed herein describe exemplary user interfaces of a client device that facilitate customizing data usage monitoring settings of a client device, a client account, or a combination of both. Particularly, the exemplary user interfaces may allow a client to modify one or more user-specified parameters that selectively monitor and control data usage. The one or more user-specified parameters may be set via selectable options on a user interface, and may include a data usage tracking parameter, a time granularity parameter, a monitoring parameter, and an event modifying parameter. Further, the exemplary user interfaces may enable a client to customize a graphical representation of data usage over a predetermined period of time. The graphical representation may correspond to data usage of a client device, a client account, or combination of both.

The term "techniques," as used herein, may refer to system(s), method(s), computer-readable instruction(s), module(s), algorithms, hardware logic, and/or operation(s) as permitted by the context described above and throughout the document.

FIG. 1 illustrates a schematic view of a computing environment 100 that facilitates providing one or more recommendations that identify a means to reduce a current rate of data usage, based on monitored data usage events. Further, the computing environment 100 further facilitates dynamically altering data usage characteristics of a client device 102 over a cellular network.

In various examples, the process of providing one or more recommendations and altering data usage of particular data usage events may be performed by generating metadata that describes data usage associated with a client device 102, a client account, or a combination of both. Data usage metadata 104 may describe an amount of data usage that occurs during each instance of data usage, timestamps associated with each instance of data usage, an indication data format(s) being streamed or downloaded, and an indication of software applications initiating each instance of data usage. In the illustrated example, the client device 102 may transmit one or more first data packet(s) 106 of data usage metadata 104 to a Secure File Transfer Protocol (SFTP) Server 108. The SFTP Server 108 is a network protocol used for secure file transfer over a secure shell. The SFTP Server 108 may transmit the data usage metadata 104 to a data usage analysis system 110.

In the illustrated example, the data usage analysis system 110 may operate on one or more distributed computing resource(s) 112. The one or more distributed computing resource(s) 112 may include one or more computing device(s) 114(1)-114(N) that operate in a cluster or other configuration to share resources, balance load, increase performance, provide fail-over support or redundancy, or for other purposes. The one or more computing device(s) 114(1)-114(N) may include one or more interfaces to enable communications with other networked devices, such as the client device 102, via one or more network(s) 116. Further, the one or more network(s) 116 may include public networks such as the Internet, private networks such as an institutional and/or personal intranet, or some combination of private and public networks. The one or more network(s) 116 can also include any type of wired and/or wireless network, including but not limited to local area network (LANs), wide area networks (WANs), satellite networks, cable networks, Wi-Fi networks, Wi-Max networks, mobile communications networks (e.g. 3G, 4G, and so forth), or any combination thereof.

In the illustrated example, the data usage analysis system 110 may transmit one or more second data packet(s) 118 to a subscriber services server(s) 120 and account services server(s) 122. The one or more second data packet(s) 118 may include aggregated data usage metadata that describe data usage that has occurred over a predetermined period of time. In some examples, the predetermined period of time may correspond to a billing cycle for a network service plan. Further, the data usage metadata may be aggregated based on a client device, a client account or a combination of both. Further, data usage metadata may be further aggregated with historical instances of data usage metadata associated with the respective client device, client account, or combination of both.

The subscriber services server(s) 120 and account services server(s) 122 may use the aggregated data usage metadata as a means of verifying billing accounts and subscriber data allowance plans that are calculated independently. Further, the subscriber services server(s) 120 and the account services server(s) 122 may operate on one or more distributed computing resources that correspond to the one or more distributed computing resource(s) 112.

In the illustrated example, the data usage analysis system 110 may transmit one or more third data packet(s) 124 to the client device 102. In various examples, the one or more third data packet(s) 124 may include data that facilitates the display of data usage metadata, alerts, and recommendations on a user interface of the client device 102. Further, the one or more third data packet(s) 124 may include computational instructions that dynamically alter data usage of particular data usage events on the client device 102.

In the illustrated example, the client device 102 may include any sort of electronic device, such as a cellular phone, a smart phone, a tablet computer, an electronic reader, a media player, a gaming device, a personal computer (PC), a laptop computer, etc. The client device 102 may have a subscriber identity module (SIM), such as an eSIM, to identify the client device 102 to a telecommunication service provider network (also referred to herein as "telecommunication network").

Figure 2:
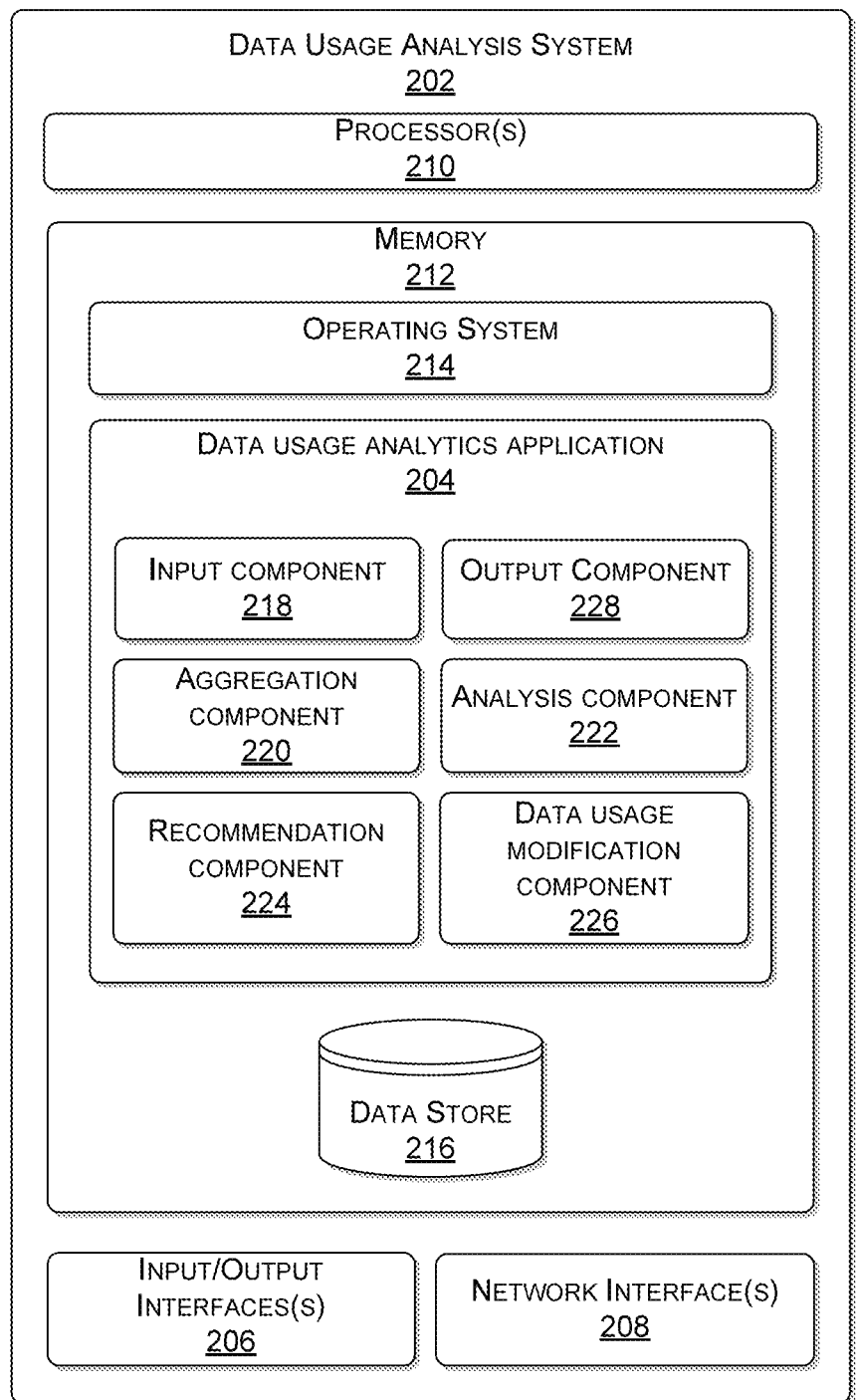
FIG. 2 illustrates a block diagram of a data usage analysis system that may aggregate and analysis metadata associated with data usage on a client device.

FIG. 2 illustrates a block diagram of a data usage analysis system 202 that may aggregate and analyze metadata that describes data usage on a client device. Particularly, the data usage analysis system 202 may execute a data usage analytics application 204 that processes metadata describing data usage that is received from a client device. Further the data usage analytics application 204 may thereafter transmit a recommendation to the client device that includes one or more action(s) that may help control (i.e. regulate the rate) data usage. Alternatively, or additionally, the data usage analysis system 202 may transmit a set of computational instructions to the client device that dynamically perform the one or more action(s).

In the illustrated example, the data usage analysis system 202 may correspond to the data usage analysis system 110. Further, the data usage analysis system 202 may include input/output interface(s) 206. The input/output interface(s) 206 may include any type of output interface known in the art, such as a display (e.g. a liquid crystal display), speakers, a vibrating mechanism, or a tactile feedback mechanism. Input/output interface(s) 206 also include ports for one or more peripheral devices, such as headphones, peripheral speakers, or a peripheral display. Further, the input/output interface(s) 206 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the data usage analysis system 202 may include network interface(s) 208. The network interface(s) 208 may include any sort of transceiver known in the art. For example, the network interface(s) 208 may include a radio transceiver that performs the function of transmitting and receiving radio frequency communications via an antenna. In addition, the network interface(s) 208 may also include a wireless communication transceiver and a near field antenna for communicating over unlicensed wireless Internet Protocol (IP) networks, such as local wireless data networks and personal area networks (e.g. Bluetooth or near field communication (NFC) networks). Further, the network interface(s) 208 may include wired communication components, such as an Ethernet port or a Universal Serial Bus (USB).

Further, the data usage analysis system 202 may include one or more processor(s) 210 that are operably connected to memory 212. In at least one example, the one or more processor(s) 210 may be a central processing unit(s) (CPU), graphics processing unit(s) (GPU), a both a CPU and GPU, or any other sort of processing unit(s). Each of the one or more processor(s) 210 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 210 may also be responsible for executing all computer applications stored in the memory, which can be associated with common types of volatile (RAM) and/or nonvolatile (ROM) memory.

In some examples, memory 212 may include system memory, which may be volatile (such as RAM), non-volatile (such as ROM, flash memory, etc.) or some combination of the two. The memory may also include additional data storage devices (removable ad/or non-removable) such as, for example, magnetic disks, optical disks, or tape.

The memory 212 may further include non-transitory computer-readable media, such as volatile and nonvolatile, removable and non-removable media implemented in any method or technology for storage of information, such as computer readable instructions, data structures, program modules, or other data. System memory, removable storage and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 212 may include an operating system 214, a data usage analytics application 204, and a data store 216. The operating system 214 may be used to implement the data usage analytics application 204. The operating system 214 may be any operating system capable of managing computer hardware and software resources. The data usage analytics application 204 may include routines, program instructions, objects, and/or data structures that perform particular tasks or implement particular abstract data types.

In the illustrated example, the data usage analytics application 204 may include an input component 218, an aggregation component 220, an analysis component 222, a recommendation component 224, a data usage modification component 226 and an output component 228. The input component 218 may continuously receive data packets of metadata describing data usage on a client device. The metadata may describe data usage over a particular cellular network, or more generally over one or more types of wired and/or wireless network(s), such as one or more network(s) 116. The input component 218 may receive data packets of metadata at predetermined time intervals, whereby each data packet corresponds to data usage that occurred during a preceding time interval. Alternatively, the input component 218 may receive each data packet at a point in time whereby data usage on the client device exceeds a predetermined threshold. The predetermined threshold may correspond to an amount of data usage that is quantified as a number of bits, kilobytes, megabytes, gigabytes, terabytes, or petabytes.

In various examples, the metadata describing data usage on a client device may identify software application(s) on the client device that initiate data usage, corresponding time stamps associated with each instance of data usage, and an amount of data usage associated with each instance. Further, the metadata may describe a format of data being accessed in each instance of data usage. In a non-limiting example, the format of data may correspond to a multimedia content input stream, a multimedia file download, or a data file download.

Each data packet may further include a client device identifier and an account identifier. The client device identifier may correspond to a Mobile Station International Subscriber Directory Number (MSISDN), which may describe a primary key to a record that contains details of a user that is authorized on a network. Alternatively, or additionally, the client device identifier may correspond to an international mobile subscriber identity (IMSI) number. An IMSI number and its related key can be used to identify and authenticate subscribers on a mobile device. The account identifier may correspond to a service provider account to which the client device is subscribed. The account identifier may help identify data usage records that correspond to the client device over a particular cellular network.

The data packet may further include one or more parameters set by a client device for the purpose of monitoring and controlling data usage. The one or more parameters may include, but are not limited to, a data usage tracking parameter, a time granularity parameter, an input stream monitoring parameter, and an input stream modification parameter. Note that the one or more parameters are described in further detail with reference to FIG. 3.

In the illustrated example, the aggregation component 220 may aggregate data usage metadata based on a client device, a client account, or a combination of both. Data usage metadata may be further aggregated with previous instances of data usage metadata that relate to one of a client device, client account, or a combination of both. Additionally, or alternatively, data usage metadata may be aggregated based on one or more criteria including, but not limited to, timestamps associated with data usage, an indication of data format(s), or an indication of the software application(s) initiating the data usage. Time stamps associated with data usage may provide a chronological record of data usage. Also, aggregating metadata based on a data format may provide insight into relative data usage of different data formats including, but not limited to, a multimedia stream, a multimedia file download, or a data file download.

In the illustrated example, the analysis component 222 may receive aggregated data usage metadata from the aggregation component 220. The analysis component 222 may determine an amount of data usage that has occurred within a predetermined time period. The amount of data usage may be associated with a client device, a client account, or combination of both. For example, the analysis component 222 may determine that a particular client device of a client account has used a ten-gigabyte data allocation of a thirty-gigabyte data allowance. Alternatively, or additionally, the analysis component 222 may quantify a rate of data usage that is based on the amount of data usage at a given point in time during a predetermined time interval. For example, a ten-gigabyte allocation of a data allowance that has been used over a 10-day time interval may be expressed as one-gigabyte per day. Further, the data usage rate may be compared with a data allowance rate that is based on an entire data allowance allocation being used over a predetermined time interval (i.e. a billing cycle). For example, a data allowance of 20-gigabytes that is allocated for use over a 30-day time interval may be expressed as a one-gigabyte per day data allowance rate. In doing so, the analysis component 222 may determine a likelihood that data usage, at a given point in time, may exceed a data allowance prior to expiration of the predetermined time interval.

In various examples, the analysis component 222 may further determine an amount of data usage, or a data usage rate that is associated with particular data usage events. Data usage events may include instances of multimedia streams, multimedia file downloads, or data file downloads. The purpose of doing so may provide insight as to whether particular data usage events are likely to cause an overall data usage to exceed a data allowance allocation. For example, a client device may stream multimedia content at a bit rate of five-megabits per second. The analysis component 222 may determine that continued streaming of the multimedia content, for a given period of time, may cause the absolute data usage to exceed the data allowance allocation. Alternatively, or additionally, the analysis component 222 may determine whether an associated data usage rate may exceed the data allowance rate.

The analysis component 222 may further identify certain user behaviors associated with data usage, such as a user tendency to selectively abandon a multimedia stream partway, rather than streaming the multimedia content in its entirety. A benefit of doing so may allow the data usage analytics application 204 to employ, or recommend, pacing techniques that modify a size of data objects associated with a multimedia stream. When streaming multimedia content, data objects associated with the multimedia stream are downloaded to a buffer of a client device. Pacing techniques may configure the size of the data objects based on a 'just in time delivery' of the multimedia stream to the client device. Doing so may avoid wasting data usage associated with downloading data objects that are left in the buffer of the client device when a multimedia stream is abandoned.

In the illustrated example, the recommendation component 224 may provide one or more recommendations to a client device in the event that the analysis component 222 determines that a current data usage or a current data usage rate is likely to exceed a data allowance or data allowance rate, respectively. The current data usage or current data usage rate may be associated with a client account, or one or more client device(s) of the client account. In some examples, the one or more recommendations may include visual and/or audible alerts that indicate a current status of data usage or data usage rate. The delivery and receipt of the one or more recommendations may be configured via a user interface of a client device, provided the client device is authorized to configure such aspects associated with the client account.

Further, recommendation component 224 may generate recommendations that describe how to reduce a current data usage rate, based on monitored data usage events. In a first non-limiting example, the analysis component 222 may determine that ongoing performance of a particular data usage event, such as a multimedia file download, may cause a current data usage to exceed a data allowance allocation. In doing so, the recommendation component 224 may transmit a recommendation to complete performance of the multimedia file download via an alternate communications network that does not draw from the data allowance allocation.

In a second non-limiting example, the analysis component 222 may determine that ongoing performance of a multimedia stream may cause a current data usage rate to exceed a data allowance rate, or data usage to exceed a data allowance allocation. In doing so, the recommendation component 224 may transmit a recommendation to reduce transmission quality of the multimedia stream for the purpose of reducing the current data usage rate. Transmission quality may refer to resolution of video content, and/or the bit rate of video and audio content. Alternatively, the recommendation component 224 may recommend streaming the multimedia content via an alternate communications network that does not draw from the data allowance allocation. It is noteworthy that providing one or more recommendations to modify data usage characteristics of data usage events may be based at least in part on the user selection to monitor characteristics of a data usage event.

In the illustrated example, data usage modification component 226 may generate computational instructions that dynamically modify data usage characteristics of a particular data usage event on a client device. The computational instructions may be based at least in part on the one or more recommendations of the recommendation component 224. In a first non-limiting example, computational instructions may reduce a file size of multimedia file download or a data file download using transcoding techniques. Transcoding techniques may automatically reduce a file size of a multimedia file or a data file by modifying data elements associated with multimedia content to reduce a file size of an associated multimedia file. In some examples, transcoding may impact the resolution of multimedia content relative to an original presentation of the multimedia content. Alternatively, to avoid impacting the resolution of multimedia content, computational instructions may limit downloading of a multimedia file or a data file to a communications network that does not draw on a data allocation from the data allowance.

In a second non-limiting example, computational instructions may automatically reduce a data usage rate of a multimedia stream using trans-rating techniques. Trans-rating describes a process of modifying a video input stream, and occurs through an analysis of multimedia content, the client device, or cellular network. For example, an analysis of multimedia content may determine that a bit rate may be lowered without substantially altering the viewing quality of the multimedia content. Further, the bit rate of a video input stream may be further based at least in part on the resolution and screen size of the client device. For example, the resolution of a particular multimedia content may be higher than a screen resolution of the client device. In this instance, trans-rating techniques may reduce the bit rate associated with the particular multimedia content such that the resolution of the particular multimedia content is substantially similar to the screen resolution of the client device.

In a third non-limiting example, computational instructions may employ pacing techniques to limit traffic delivery of data to "just in time," rather than downloading data objects in their entirety to a buffer of a client device. Employing pacing techniques may be based at least in part on an indication from the analysis component 222 of a user tendency to selectively abandon streaming a multimedia stream partway, rather than streaming the multimedia content in its entirety. Pacing techniques describe a process of limiting traffic delivery of data to a client device to a "just in time" delivery, rather than downloading a data object in its entirety to a buffer of a client device. Thus pacing techniques may avoid bursts of data usage, and may offer data usage savings when a data object (i.e. a video input stream or an audio input stream) is "abandoned" part way through. When abandonment occurs, the portion of the data object (i.e. video input stream or audio input stream) left in the client device buffer is effectively wasted.

It is noteworthy that generating computational instructions to modify data usage characteristics of data usage events may be based at least in part on the user selection to monitor characteristics of a data usage event.

In the illustrated example, the data store 216 may include data records associated with individual client accounts. The data records may include metadata describing data usage associated with a client account and data usage that is apportioned among one or more client device(s) of the client account. Further, the data records may include historical analyses of data usage as performed by the analysis component 222, and recommendations, as provided by the recommendation component 224.

In such an example, the output component 228 may transmit an output from the recommendation component 224 and/or the data usage modification component 226 to one or more client device(s) associated with the client account. The output may include one or more recommendations from the recommendation component 224 that describe how to reduce a current data usage rate based on monitored data usage events. Alternatively, or additionally, the output may include computational instructions from the data usage modification component 226 that dynamically modify data usage characteristics of a particular data usage event on one or more client device(s) of the client account.

Figure 3:
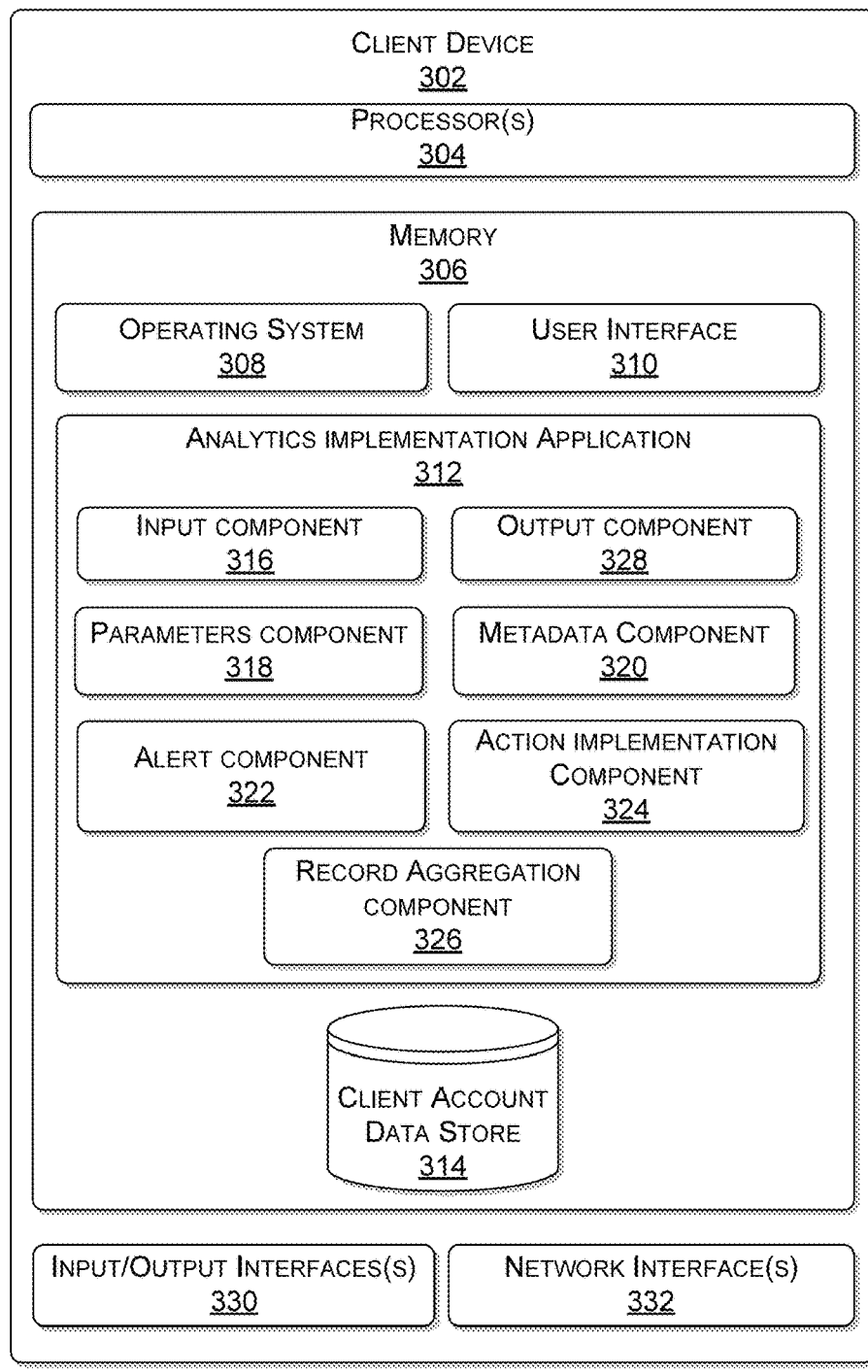
FIG. 3 illustrates a block diagram of a client device that may execute an analytics implementation application, based on data received from a data usage analytics application.

FIG. 3 illustrates a block diagram of a client device 302 that may execute an analytics implementation application, based on data received from a data usage analytics application 204. In some examples, the analytics implementation application 312 may display alerts and recommendations on a user interface 310 of the client device 302. The alerts may relate to a current state of data usage associated with the client device. Further one or more recommendations may convey opportunities to modify the current state of data usage on the client device, such that data usage falls within the bounds of a predetermined data allowance. The analytics implementation application 312 may also execute computational instructions received from a data usage analytics application 204. The computational instructions may dynamically customize configuration settings of a client device that modify a current rate of data usage on the client device. For example, computational instructions may employ transcoding computations techniques to reduce a file size of a multimedia file being downloaded, thereby ultimately reducing data usage over a cellular network. Further, computational instructions may employ trans-rating and pacing computational techniques to reduce a bit rate of multimedia input stream, further reducing data usage over the cellular network.

In the illustrated example, the client device 302 may correspond to client device 102. Further, the client device 302 may include one or more processor(s) 304 operably connected to memory 306. The one or more processor(s) 304 may correspond to the one or more processor(s) 210, and the memory 306 may correspond to the memory 212.

In the illustrated example, the memory 306 may include an operating system 308, a user interface 310, an analytics implementation application 312, and a client account data store 314. The operating system 308 may be used to implement the analytics implementation application 312. The operating system 308 may be any operating system capable of managing computer hardware and software resources. The analytics implementation application 312 may include routines, program instruction, objects, and/or data structures that perform particular tasks or implement particular abstract data types.

In the illustrated example, the user interface 310 that may facilitate customizing data usage monitoring settings associated with one or more client device(s) of a client account. Customization settings may include a selectable option to monitor data usage, set a time granularity parameter. The user interface 310 may also facilitate customizing user preferences for receiving one or more recommendations that describe how to reduce a current data usage and/or current data usage rate, or dynamically modifying data usage characteristics of a data usage events on the client device 302. The user interface 310 may further display various representations of data usage that are associated with the client device 302, or the associated client account. Note that the user interface 310 is discussed in more detail with reference to FIGS. 4A through to 4E.

In the illustrated example, the analytics implementation application 312 may include an input component 316, a parameters component 318, a metadata component 320, an alert component 322, an action implementation component 324, a record aggregation component 326, and an output component 328. The input component 316 may receive a data packet from a data usage analytics application 204 of the data usage analysis system 202. The data packet may include one or more recommendations that describe how to reduce a current data usage and/or current data usage rate based on monitored data usage events. Alternatively, or additionally, the data packet may include computational instructions that, when executed by the one or more processor(s) 304, dynamically modify data usage characteristics of a particular data usage event on the client device 302.

The parameters component 318 may store an indication of one or more user-specified parameters that selectively monitor and control data usage associated with a client account, and/or one or more client device(s) associated with the client account. The one or more user-specified parameters may be set via selectable options on a user interface of the client device 302. The one or more user-specified parameters may include a data usage tracking parameter, a time granularity parameter, a monitoring parameter, and an event modifying parameter, each of which is described in further detail below.

The data usage tracking parameter may indicate a format by which a user prefers data usage to be reported. For example, data usage may be reported as a rate of data usage over a predetermined period of time. Alternatively, or additionally, data usage may be reported as an absolute amount of data usage relative to an absolute data allowance. Data allowance may represent a maximum amount of data usage allocated for use by a client account, or one or more client device(s) of the client account during a predetermined time interval. Data usage may reset to zero at an expiration of the predetermined time interval. In some examples, the predetermined time interval may correspond to a billing cycle of a service provider that allocates the data allowance.

In a first non-limiting example, the data usage tracking parameter may indicate a first user selection to report an absolute amount of data usage relative to an absolute data allowance. For example, a data allowance may correspond to 30-gigabytes that may be used within a predetermined time interval of 30-days (i.e. a billing cycle). An absolute amount of data usage may be expressed as four-gigabytes of a 30-gigabyte data allowance.

In a second non-limiting example, the data usage tracking parameter may indicate a second user selection to report data usage as a data usage rate. The data usage rate may be expressed as an amount of data usage over an expired portion of a predetermined time interval. The predetermined time interval may correspond to a time interval for which an allocation of data allowance may be used. For example, a data usage of eight-gigabytes within a four-day period of a predetermined time interval, may be expressed as a data usage rate of two-gigabytes per day. Further the data usage rate may be compared with a data allowance rate, which quantifies a distribution of the data allowance over the entire predetermined time interval. For example, a data allowance rate may correspond to one-gigabyte per day, based on a data allowance allocation of 30-gigabytes over a 30-day predetermined time interval.

The time granularity parameter may quantify a time increment by which metadata describes data usage. For example, a time granularity parameter of 15-minutes, may cause an analytics implementation application on client device to generate metadata that describes data usage in 15-minute increments. The time granularity parameter may be any numerical time increment that is substantially similar to, or less than, the predetermined time interval that is associated with the data allowance allocation.

The monitoring parameter may indicate a user selection to monitor data usage characteristics of a particular data usage event on a client device. In some examples, a data usage event may correspond to an instance of a multimedia stream, a multimedia file download, or a data file download. In some examples, the monitoring parameter may further indicate a user selection to monitor data usage associated with particular software applications that initiate data usage. Further, data usage characteristics may describe an amount of data that is being used, or that is likely to be used, by a particular data usage event, data format(s) associated with the data being streamed or downloaded, or an indication of software application(s) initiating the data usage. For example, data usage characteristics of a multimedia stream may include a corresponding bit rate. Alternatively, or additionally, data usage characteristics of a multimedia file download may correspond to a bit rate and/or a file size. Further, monitoring data usage characteristics of a multimedia stream may involve monitoring whether multimedia content of a multimedia stream is streamed in its entirety, or whether the user selectively abandons the multimedia stream, part way.

The event modifying parameter may indicate a user selection to modify data usage characteristics of a particular data usage event on a client device. A data usage event may correspond to an instance of a multimedia stream, a multimedia file download, or a data file download. For example, modifying data usage characteristics of a multimedia file download or a data file download may correspond to modifying a respective bit rate and/or file size. Further, modifying data usage characteristics of a multimedia stream may involve reducing a corresponding bit rate (i.e. video quality or audio quality), or employing pacing techniques that limit traffic delivery of data to "just in time," rather than downloading data objects in their entirety to a buffer of a client device. Pacing techniques may avoid bursts of data usage, particularly when users tend to selectively abandon a multimedia stream part way. When abandonment occurs, the portion of the data object (i.e. video input stream or audio input stream) left in the client device buffer is effectively wasted.

The metadata component 320 may generate metadata that describes data usage associated with one or more client device(s) of a client account. The data usage metadata may describe an amount of data usage that occurs during each instance of data usage, timestamps associated with each instance of data usage, an indication data format(s) being streamed or downloaded, and an indication of software applications initiating each instance of data usage. Further, the metadata component 320 may generate metadata based at least in part on one or more parameters defined by the parameters component 318. The one or more parameters may include a time granularity parameter, and a monitoring parameters. In a non-limiting example, a user selection may define a time granularity parameter as 15-minutes. In doing so, the metadata component 320 may generate metadata data that describes data usage in 15-minute increments. In another non-limiting example, a user selection may indicate that data usage characteristics may be monitored. Data usage characteristics may include an amount of data being used for a particular data usage event or a corresponding bit rate. Further, data usage events may include a multimedia stream, a multimedia file download, or a data file download.

The alert component 322 may generate an alert that indicates a current state of data usage or data usage rate. An alert may include a visual alert, an audible alert, or a combination of both. In some examples, an alert may indicate an amount of data usage or a data usage rate is at or has exceeded a predetermined threshold. In one example, the predetermined threshold may correspond to a service plan or subscription plan data allowance that is associated with a client account. In another example, the predetermined threshold may correspond to a bit rate or a bandwidth limit that is associated with the client account.

In some examples, the alert component 322 may further generate an alert that includes one or more recommendations generated by the recommendation component 224 of the data usage analysis system 202. In a non-limiting example, the one or more recommendations may include information that describes how to reduce a current data usage rate, based on monitored data usage events.

The action implementation component 324 may execute computation instructions that dynamically modify data usage characteristics of a particular data usage event on the client device 302. In some examples, the data usage modification component 226 of the data usage analysis system 202 may generate the computational instructions. Further, the computational instructions may be based at least in part on the one or more recommendations of the recommendation component 224. In various examples, the action implementation component 324 may implement computational instructions that reduce a file size of a data file download using trans-coding techniques, reduce a data usage rate of a multimedia stream using trans-rating techniques, or employ pacing techniques that limit traffic delivery of data to "just in time" rather than downloading data objects that are selectively abandoned while streaming multimedia content.

The record aggregation component 326 may aggregate data usage metadata based on one or more criteria. In various examples, data usage metadata may be aggregated based on a client device, a client account, or a combination of both. Further, data usage metadata may be aggregated with previous instances of data usage metadata that relate to one of a client device, client account, or a combination of both. In some examples, metadata that is associated with a client device, or a client account, may be further aggregated based on timestamps associated with data usage, an indication of data format(s) associated with the data being streamed or downloaded, or an indication of software application(s) initiating the data usage.

Further, the output component 328 may transmit a data packet of metadata, from the metadata component 320 to the data usage analysis system 202. The data usage metadata may include metadata that describes an amount of data usage that occurs on the client device 302, a client account, or a combination of both. The data usage metadata may further describe timestamps associated with each instance of data usage, an indication data format(s) being streamed or downloaded, and an indication of software applications initiating each instance of data usage.

The client account data store 314 may include data records of data usage associated with the client device 302. In some examples, the data records may include metadata describing data usage associated with a client account that is associated with the client device 302. Alternatively, or additionally, the client account data store 314 may include historical analyses of data usage associate with the client device, or a client account associated with the client device 302. The historical analyses may include the one or more recommendations provided by the recommendation component 224 of the data usage analysis system 202.

In the illustrated example, the client device 302 may include input/output interface(s) 330 and network interfaces(s) 332. The input/output interface(s) 330 and the network interface(s) 332 may be functionally similar to the input/output interface(s) 206 and the network interface(s) 208 respectively.

Figure 4A:
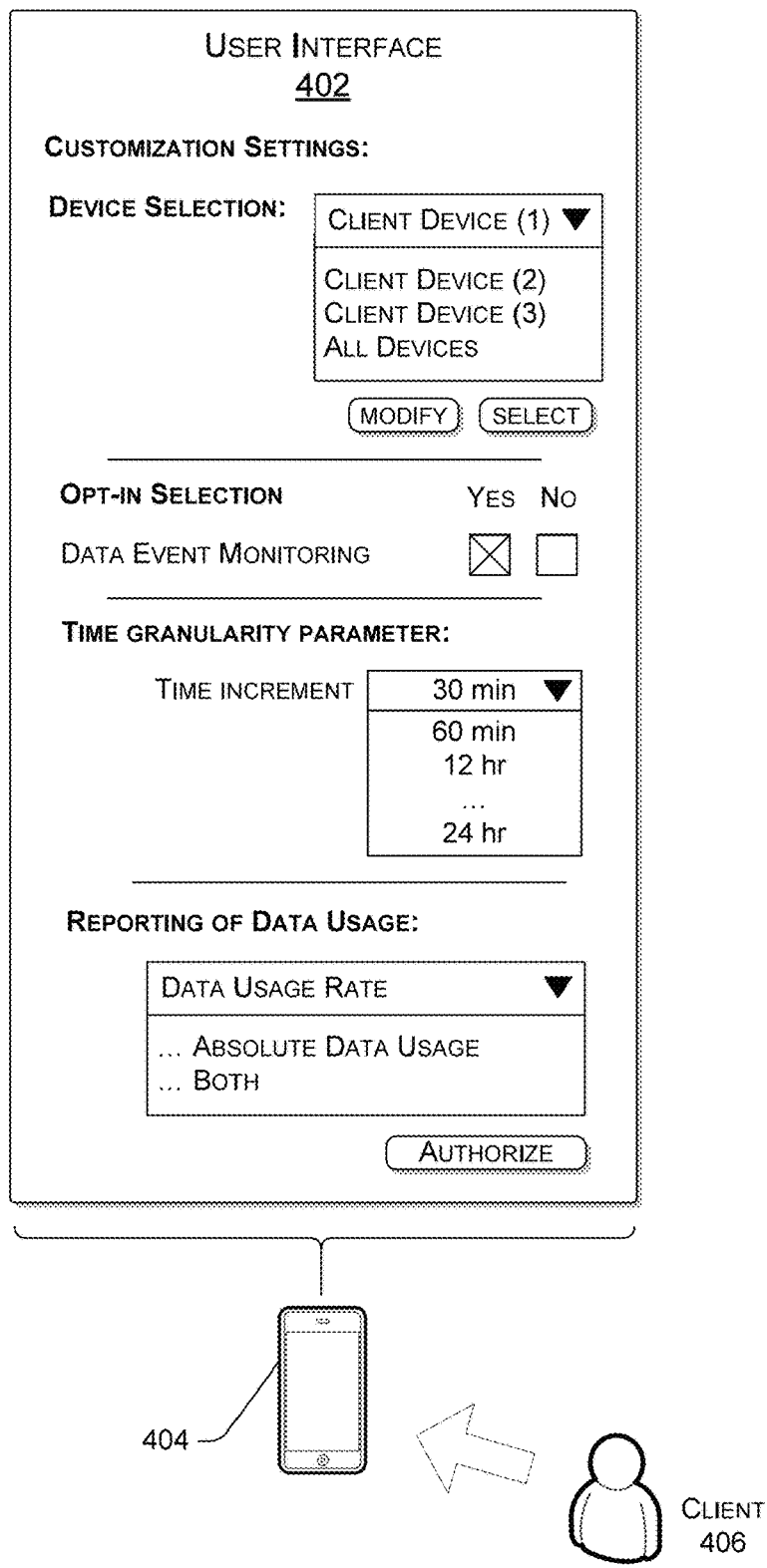
FIGS. 4A, 4B, 4C, 4D, and 4E illustrates exemplary embodiments of a user interface for client device.

FIG. 4A illustrates an exemplary user interface 402 of a client device 404 that facilitates customization of data usage monitoring settings. In various examples, the user interface 402 may allow a client 406 to modify data usage monitoring settings for one or more client devices associated with a client account. Further, the exemplary user interface 402 may present an option for a client 406 to selectively opt-in to data event monitoring. In some examples, a selection to opt-in, or opt-out, of data event monitoring may respectively modify the monitoring parameter stored within the parameters component 318 of the client device 302. A selection to opt-in for data event monitoring may cause the metadata component 320 of the client device 302 to record data usage characteristics of particular data usage events such as an instance of a multimedia stream, a multimedia file download, or a data file download. Further, data usage characteristics may also include an amount data that is being, or that is likely to be used, by a particular data usage event, data format(s) associated with the data being streamed or downloaded, or an indication of software application(s) initiating the data usage.

Further, the user interface 402 may present one or more options for a client 406 to select a time granularity parameter that quantifies a time increment by which metadata describes data usage. A selection of a time granularity parameter via the user interface 402 may correspondingly modify and set the time granularity parameter stored within the parameters component 318 of the client device 302.

The user interface may also present one or more options that configure a format by which data usage is reported to the client 406. For example, a client may select data usage to be reported as a data usage rate, an absolute data usage, or a combination of both. A selection of monitoring a data usage rate, absolute data usage, or a combination of both, may correspondingly modify and set the data usage tracking parameter stored within the parameters component 318 of the client device 302.

Figure 4B:
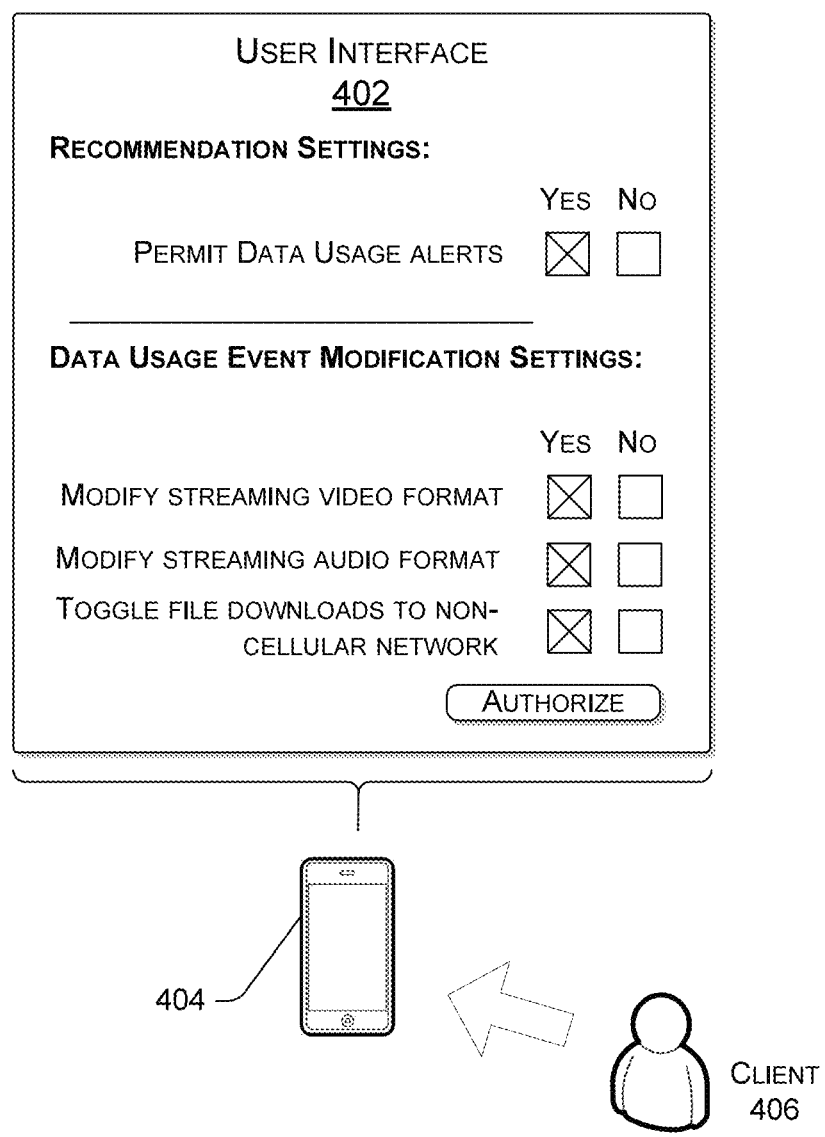

FIG. 4B illustrates an exemplary user interface 402 that presents a client 406 with one or more options to configure receipt of alerts relating to data usage, and to configure parameters that dynamically control a modification of data usage characteristics. For example, a selection to receive data usage alerts may cause the recommendation component 224 of the data usage analysis system 202 to generate one or more recommendation(s) relating to data usage. Further, a selection to receive alerts may further cause the alert component 322 of the client device 302 to generate a visual, audible, or audio-visual alert that is based at least in part on the one or more recommendation(s). In some examples, the alerts may overlay an existing presentation of data on the user interface 402. For example, the client 406 may operate a software application via the client device 404 that streams multimedia content from an online resource. In doing so, the alert component 322 may cause an alert to overlay the presentation of the multimedia content with a recommendation to reduce a current resolution of the multimedia content, or consider streaming the multimedia content using an alternate communications network.

Further, the user interface 402 may present one or more options relating to modifying a data usage event, such as modifying a streaming video format, a streaming audio format, or to toggle file downloads to non-cellular networks that do not impact a data usage allowance. A selection to modify a data usage event via the user interface 402 may cause the data usage modification component 226 of the data usage analysis system 202 to generate computational instructions that correspond to the selection. Further, the selection may further cause the action implementation component 324 of the client device 302 to execute the computation instructions received from the data usage analysis system 202.

Figure 4C:
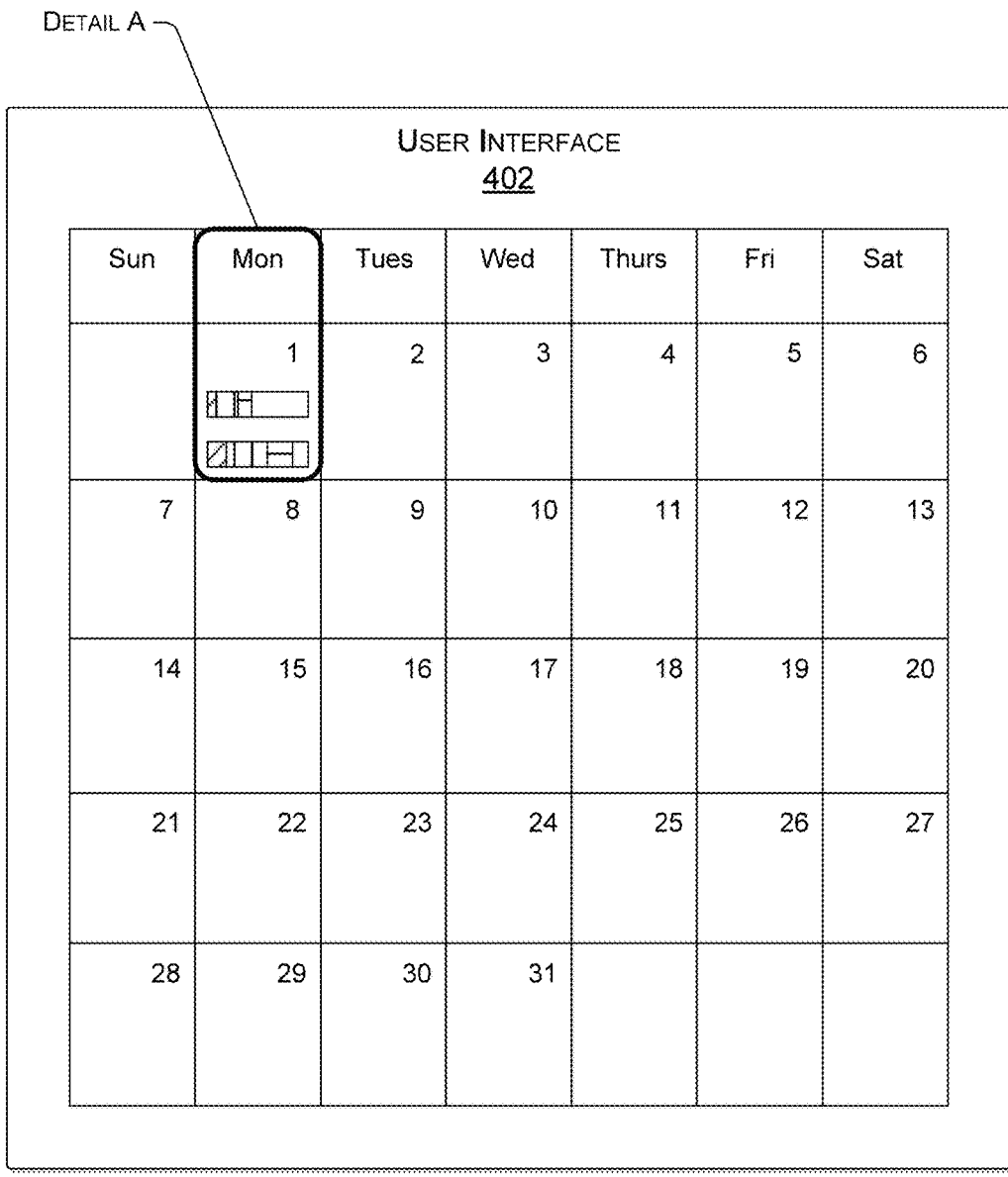

FIG. 4C illustrates an exemplary user interface 402 that presents a chronological record of data usage over a predetermined period of time. In the illustrated example, the chronological record corresponds to a one-month period. In other examples, the chronological record may correspond to a number of days within a service plan billing cycle. Particularly, the chronological record may illustrate a graphical representation of data usage for each day that data usage has occurred. Data usage may be represented on a per client device basis, a client account basis, or a combination of both. In the illustrated example, data usage on the first day of the month is represented by two-bar graphs that overlay the first day of the month.

Figure 4D:
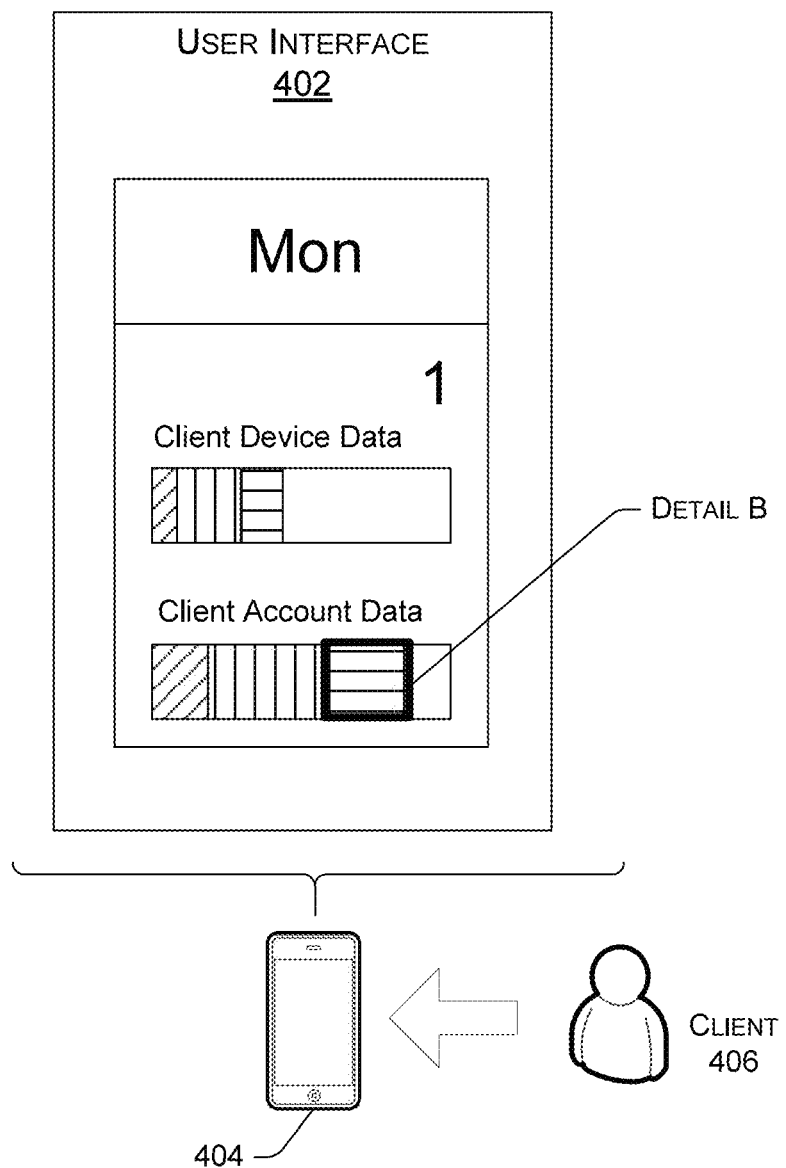

FIG. 4D illustrates a detail view at Detail A of FIG. 4C. Particularly, FIG. 4D illustrates an exemplary user interface that presents bar-graphs that reflect data usage of one or more client device(s) of a client account. In some examples, the bar graph may reflect data usage that occurs on a particular day. Alternatively, the bar graph may reflect cumulative data usage over a predetermined period of time, such as the expired time period of billing cycle for a network service plan. Further, different colors may be used to distinguish data usage events, such as multimedia streams, multimedia file downloads, or data file downloads. In various examples, a client 406 may access the pictorial view of the bar graphs by selecting, via the user interface 402, a particular day on the chronological record shown in FIG. 4C.

Figure 4E:
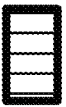
Figure 4E:
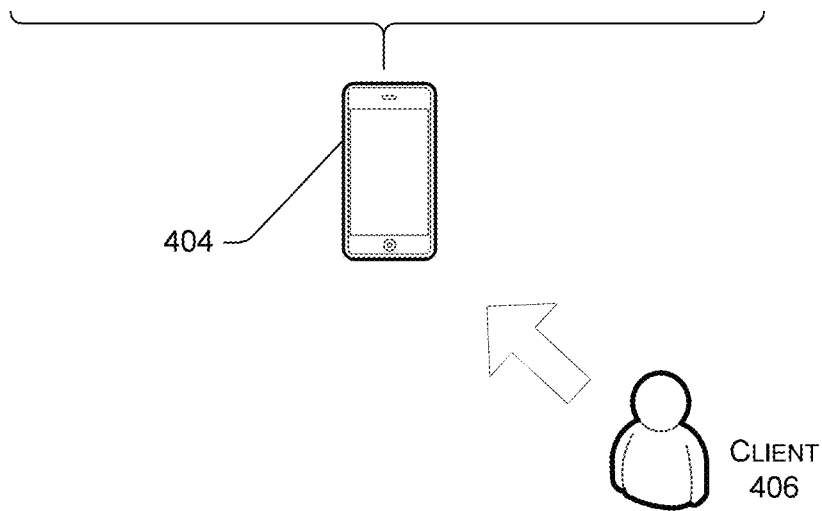

FIG. 4E illustrates a detail view of Detail B of FIG. 4D. Particularly, FIG. 4E illustrates an exemplary user interface 402 that presents a data usage summary based on a selection of a particular bar-graph segment associated with client account data, as shown in FIG. 4D. In the illustrated example, the bar-graph segment corresponds to video streaming data usage associated with the client account. The summary data may include a list of one or more client devices and their respective video streaming data usage. Data usage may be expressed as an absolute amount of data usage. In various examples, a client 406 may access the data usage summary by selecting, via the user interface 402, a particular bar-graph segment on a bar graph, as presented in FIG. 4D.

In a non-limiting example, summary data may be presented in various other formats that are selectively configurable via the user interface. In a non-limiting example, a summary data may display a summarize data usage for one or more client device(s) of a client account, based on software applications that initiate the data usage, the data usage event, the calendar date, and the time of day.

Figure 5:
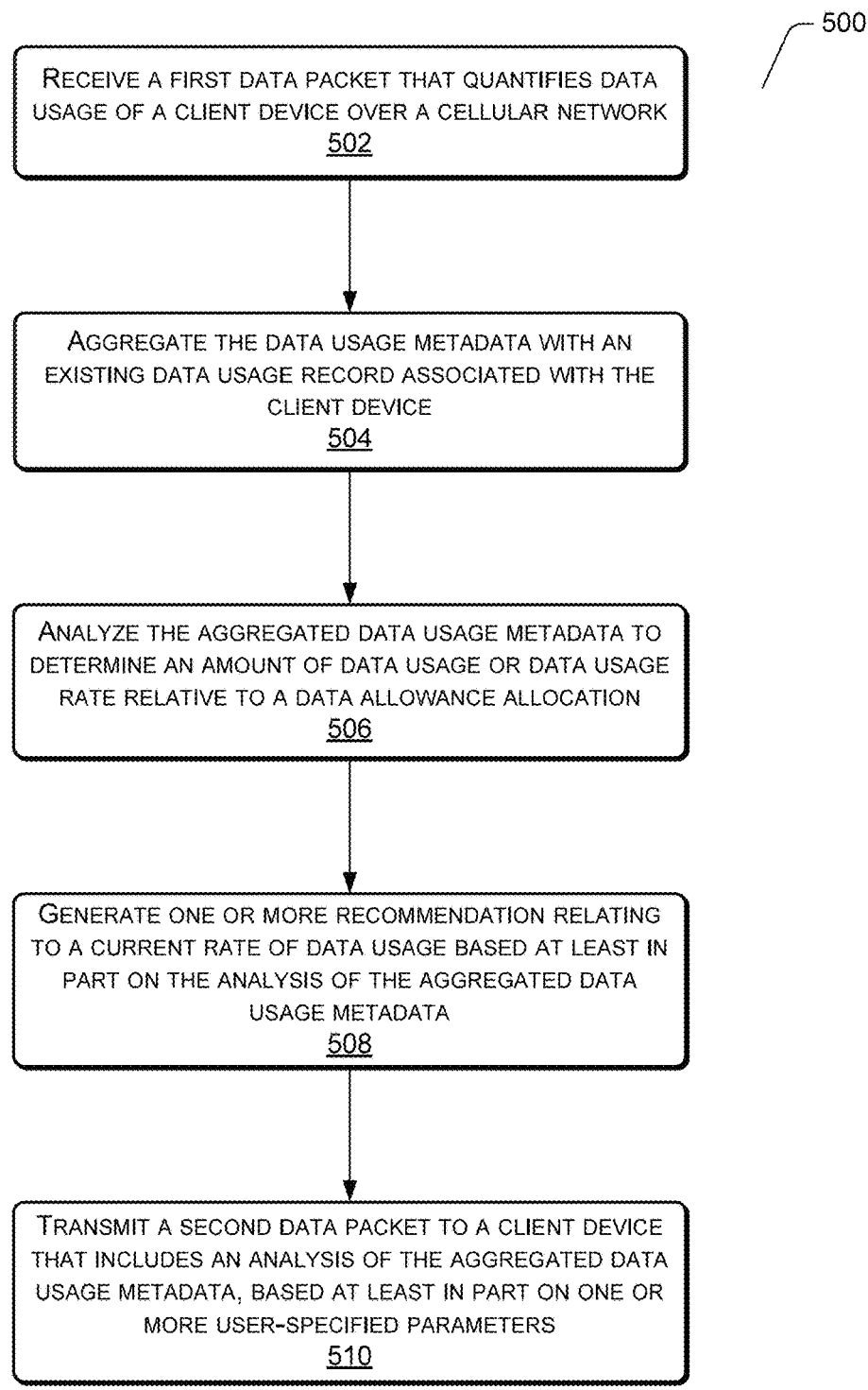
FIG. 5 illustrates a flow diagram for generating and transmitting data usage records that quantify data usage of a client device, or a client account.
Figure 6:
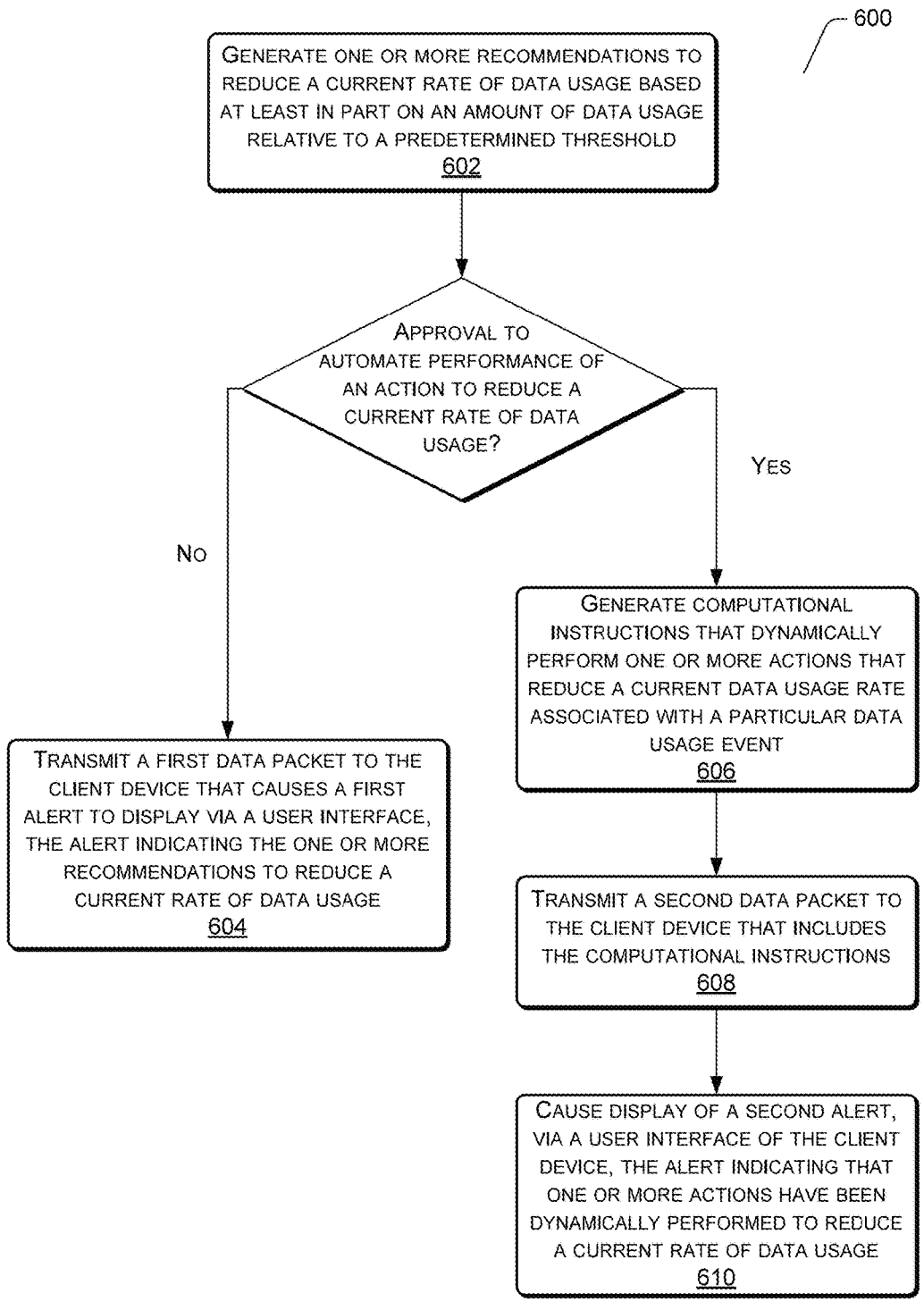
FIG. 6 illustrates a flow diagram for generating one or more recommendations that relate to a current rate of data usage on a client device, and generating computational instructions that may dynamically reduce the current rate of data usage.

FIGS. 5 and 6 present processes 500 and 600 that relate to operations of the data usage analytics application. Each of processes 500 and 600 illustrates a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500 and 600 are described with reference to the computing environment 100 of FIG. 1.

FIG. 5 illustrates a flow diagram for generating and transmitting data usage records that quantify data usage of a client device, a client account, or a combination of both. Data usage records may correspond to data usage over a particular communications network, such as a cellular network.

At 502, a data usage analytics application may a receive a data packet that quantifies data usage of a client device over a cellular network. The data packet may include a client device identifier and an account identifier that associates the client device with a particular client account. The data packet may also include metadata that identifies software application(s) on the client device that initiate data usage, corresponding time stamps associated with each instance of data usage, and an amount of data usage associated with each instance. Metadata may also describe a format of data being accessed in each instance of data usage, such as but not limited to, a multimedia content input stream, a multimedia file download, or a data file download.

At 504, the data usage analytics application may aggregate data usage metadata based on a client device, a client account, or a combination of both. Data usage metadata may be further aggregated with historical instances of data usage metadata that are associated with a respective client device, client account, or a combination of both. Additionally, or alternatively, data usage metadata may be aggregated based on one or more criteria including, but not limited to, timestamps associated with each instance of data usage, an indication data format(s) being streamed or downloaded, and an indication of software applications initiating each instance of data usage.

At 506, the data usage analytics application may use the aggregated data usage to determine an amount of data usage that has occurred during a predetermined time interval, or a rate of data usage that is based on the amount of data usage at a given point in time during the predetermined time interval. The amount of data usage and the rate of data usage may be based on a client device, a client account, or a combination of both. Further, the amount of data usage may be used to determine whether an amount of data usage or a data usage rate is at or has exceed a predetermined threshold. In some examples, an amount of data usage or data usage rate may be determined for particular data usage events, such as multimedia streams, multimedia file downloads, or data file downloads.

At 508, the data usage analytics application may generate one or more recommendations relating to a current rate of data usage based at least in part on the analysis of the aggregated data usage metadata. In some examples, a recommendation may identify a particular data usage event or software application that accounts for a disproportionate amount of data usage. Further, one or more recommendations may describe steps to reduce a current rate of data usage, based on the earlier analysis of aggregated data usage metadata.

At 510, the data usage analytics application may transmit a data packet to a client device that includes the analysis of the aggregated data usage metadata and the one or more recommendations. In various examples, the aggregated data usage metadata may be based on one or more user-specified parameters, such as a data usage tracking parameter, a time granularity parameter, or a monitoring parameter. The data usage tracking parameter may indicate a format by which a client prefers data usage to be reported. For example, data usage may be reported as an absolute amount of data usage relative to an absolute data allowance, or as a rate of data usage over a predetermined period of time. Further, the time granularity parameter may quantify a time increment by which metadata describes data usage. The monitoring parameter may indicate a user preference to monitor particular data usage events or particular software applications that initiate data usage.

FIG. 6 illustrates a flow diagram for a data usage analytics application process for generating computational instructions that may dynamically reduce a current rate of data usage. In some examples, data usage records associated with a particular client device may be used to generate computational instructions for other client devices that share a same client account with the particular client device. This may occur on the basis that, collectively, the particular client device and the other client devices all share a common data allowance allocation.

At 602, the data usage analytics application may generate one or more recommendation to reduce a current rate of data usage based at least in part on an amount of data usage relative to a predetermined threshold (i.e. data allowance allocation). The one or more recommendations may include, identifying a particular data usage event or software application that accounts for a disproportionate amount data usage. Further, the one or more recommendations may recommend: downloading a multimedia/data file or streaming a multimedia file via an alternate communications network that does not draw from the data allowance allocation, and/or reducing a video resolution or audio resolution of a particular data usage event.

At 604, the data usage analytics application may determine that a current setting of a user-specified event modifying parameter indicates that automated modification of data usage characteristics, associated with a particular data usage event, is not permitted. In response, the data usage analytics application may transmit data packet(s) to the client device that causes an alert to display via a user interface of the client device. The alert may be configured to indicate the one or more recommendations that reduce the current rate of data usage.

At 606, the data usage analytics application may determine that a current setting of the user-specified event modifying parameters indicates that automated modification of data usage characteristics, associated with a particular data usage event, is permitted. In response, the data usage analytics application may generate computational instructions that dynamically perform one or more actions that reduce a current data usage rate associated with a particular data usage event. For example, computational instructions may dynamically reduce a file size of a multimedia file download or a data file download using transcoding techniques, limit a capability to download a multimedia file or a data file to a communications network that do not draw from a data allowance allocation, or automatically reduce a data usage rate of a multimedia stream using trans-rating techniques, pacing techniques, or a combination of both.

At 608, the data usage analytics application may transmit a data packet to the client device that includes the computational instructions. In various examples, the data packet may be configured such that the computational instructions automatically execute on the client device, via an action implementation component, at a point in time when the data packet is downloaded onto the client device.

At 610, the data usage analytics application causes a second alert to display via a user interface of the client device. The alert may be configured to indicate that one or more actions have been dynamically performed to reduce a current data of data usage.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A data usage analysis system, comprising:
one or more processors:
memory coupled to the one or more processors, the memory including one or more components that are executable by the one or more processors to:
receive, a first data packet that includes data usage metadata associated with a client device, the data usage metadata corresponding to real-time monitored instances of one or more user applications executed by the client device;
identify a current data usage event that is being executed on the client device, the current data usage event corresponding to one of a first instance of a multimedia stream, a second instance of a multimedia file download, or a third instance of a data file download;
determine a data usage rate associated with the current data usage event, based at least in part on the data usage metadata;
in response to the data usage rate being greater than a predetermined data usage threshold, analyze the current data usage event to identify one or more data usage characteristics;
reduce the data usage rate of the current data usage event to a reduced data usage rate that is less than or equal to the predetermined data usage threshold, based at least in part on the one or more data usage characteristics; and
transmit, to the client device, a second data packet that includes a first set of computer-executable instructions that dynamically reduce the data usage rate of the current data usage event and a second set of computer-executable instructions that present overlay an alert onto a user interface of the client device, the alert indicating that one or more actions have been dynamically performed to reduce the data usage rate associated with the client device.

2. The data usage analysis system of claim 1, wherein the one or more components are further executable by the one or more processors to:
determine a user behavior associated with the real-time monitored instances of the one or more user applications executed by the client device; and
select one of a transcoding technique, a trans-rating technique, or a pacing technique to reduce the data usage rate, based at least in part on the user behavior.

3. The data usage analysis system of claim 2, wherein the current data usage event corresponds to the first instance of the multimedia stream, and wherein the user behavior corresponds to selectively abandoning the first instance of the multimedia stream at a point in time that is partway during streaming, wherein the one or more components are further executable by the one or more processors to:
select the pacing technique to reduce the data usage rate, based at least in part on the user behavior.

4. The data usage analysis system of claim 1, wherein the current data usage event corresponds to the second instance of the multimedia file download, and wherein the one or more components are further executable by the one or more processors to:
reduce, via a transcoding technique, a file size associated with a multimedia file of the second instance of the multimedia file download, based at least in part on the data usage rate being greater than the predetermined data usage threshold.

5. The data usage analysis system of claim 1, wherein the first data packet further includes a monitoring parameter that indicates a user selection to monitor data usage of a particular user application, and
wherein the current data usage event that is being executed on the client device is associated with the particular user application.

6. The data usage analysis system of claim 1, wherein the current data usage event corresponds to the first instance of the multimedia stream, and wherein the one or more components are further executable by the one or more processors to:

determine a first resolution of the first instance of the multimedia stream and a second resolution of a screen of the client device; and reduce a bit-rate of the first instance of the multimedia stream via a trans-rating technique, based at least in part on the second resolution being less than the first resolution, the bit-rate corresponding to a modified resolution of the first instance of the multimedia stream that is equal to the second resolution of the screen of the client device.

7. The data usage analysis system of claim 1, wherein the one or more components are further executable by the one or more processors to:

receive, from the client device, a client selection to authorize monitoring of the one or more user applications executed by the client device, and wherein, to receive the first data packet that includes the data usage metadata is based at least in part on the client selection.

8. The data usage analysis system of claim 1, wherein the one or more components are further executable by the one or more processors to:

generate one or more recommendations to reduce the data usage rate associated with the client device, based at least in part on the data usage rate being greater than or equal to the predetermined data usage threshold;

transmit the one or more recommendations to the client device; and generate the second data packet for transmission to the client device, based at least in part on a receipt, from the client device, of a user selection of a particular recommendation of the one or more recommendations.

9. The data usage analysis system of claim 1, wherein the data usage characteristics correspond to an amount of data being used by a particular data usage event, a data format associated with the particular data usage event, or an indication of a particular user application that is associated with the particular data usage event.

10. The data usage analysis system of claim 1, wherein the first data packet further includes an event monitoring parameter that indicates a user selection to modify the data usage characteristics of a particular data usage event via one of transcoding technique, a trans-rating technique, or a pacing technique.

11. A client device, comprising:

a user interface;

one or more processors;

memory storing computer-executable instructions, that when executed on the one or more processors, causes the one or more processors to perform acts comprising:

receiving, via the user interface, a first selection of a first selectable option to customize monitoring a current data usage event of a user application, the current data usage event corresponding to a first instance of a multimedia stream, a second instance of a multimedia file download, or a third instance of a data file download;

receiving, via the user interface, a second selection to modify data usage characteristics of the current data usage event associated with the one or more user applications, based at least in part on a current data usage rate being greater than a predetermined data usage threshold;

transmitting, to a data usage analysis system, a first data packet that includes data usage metadata associated with real-time monitored instances of the one or more user applications, based at least in part on the first selection and an indication of the second selection; and in response to the current data usage rate of the current data usage event being greater than the predetermined data usage threshold, receiving, from the data usage analysis system, a second data packet that includes a first set of computer-executable instructions that dynamically reduces the current data usage rate of the current data usage event and a second set of computer-executable instructions that overlay present an alert onto the user interface, the alert indicating that one or more actions have been dynamically performed to reduce the current data usage rate.

12. The client device of claim 11, wherein the current data usage event corresponds to the second instance of the multimedia file download, and further storing computer-executable instructions that, when executed cause the one or more processors to perform acts comprising:

reducing, via a transcoding technique, a file size associated with a multimedia file of the second instance of the multimedia file download, based at least in part on the current data usage rate being greater than the predetermined data usage threshold.

13. The client device of claim 11, wherein the first selection further includes monitoring an additional data usage of an additional client device and further comprising:

receiving, via the user interface, a third selection of a third selectable option to permit receipt of one or more recommendations that relate to the additional data usage of the additional client device; and receiving, via the user interface, an additional alert that overlays a presentation of content on the client device, the additional alert including the one or more recommendations that relate to the additional data usage of the additional client device.

14. The client device of claim 13, wherein the one or more recommendations include at least one recommendation that identifies the current data usage event or a particular user application associated with the current data usage event that accounts for a disproportionate amount of data usage.

15. The client device of claim 13, wherein the one or more recommendations include at least one recommendation to adjust a video resolution or an audio resolution of the first instance of the multimedia stream or the second instance of the multimedia file download, based at least in part on the current data usage rate.

16. A computer-implemented method, comprising:

under control of one or more processors:

receiving, a first data packet that includes data usage metadata associated with a client device, the data usage metadata corresponding to real-time monitored instances of one or more user applications executed by the client device;

identifying a current data usage event that is being executed on the client device, based at least in part on the first data packet, the current data usage event corresponding to a first instance of a multimedia stream, a second instance of a multimedia file download, or a third instance of a data file download;

determining a data usage rate associated with the current data usage event, based at least in part on the data usage metadata;

in response to the data usage rate being greater than a predetermined data usage threshold, generating one or more recommendations for delivery to the client device that reduce the data usage rate to a reduced data usage rate that is less than or equal to the predetermined data usage threshold;

receiving, from the client device, a user selection of a particular recommendation of the one or more recommendations; and generating a second data packet that includes a set of computer-executable instructions that dynamically reduce the data usage rate of the current data usage event, based at least in part on the particular recommendation.

17. The computer-implemented method of claim 16, further comprising:

determining a user behavior associated with the real-time monitored instances of the one or more user applications executed by the client device, and wherein, the one or more recommendations are further based at least in part on the user behavior.

18. The computer-implemented method of claim 17, wherein the current data usage event corresponds to the first instance of the multimedia stream, and wherein the user behavior corresponds to selectively abandoning the first instance of the multimedia stream at a point in time that is partway during streaming, and wherein the one or more recommendations correspond to a pacing technique that modifies the data usage rate of the current data usage event, based at least in part on the user behavior.

19. The computer-implemented method of claim 16, further comprising:

analyzing one or more data usage characteristics that correspond to an amount of data being used by the current data usage event, a data format associated with the current data usage event, or an indication of a particular user application that is associated with the current data usage event, and wherein, determining the data usage rate is based at least in part on analysis of the one or more data usage characteristics.

* * * * *